May 31, 1927.  W. E. KIMBER  1,630,619
LIFTING TRUCK OR TROLLEY
Filed Oct. 11, 1926  2 Sheets-Sheet 1
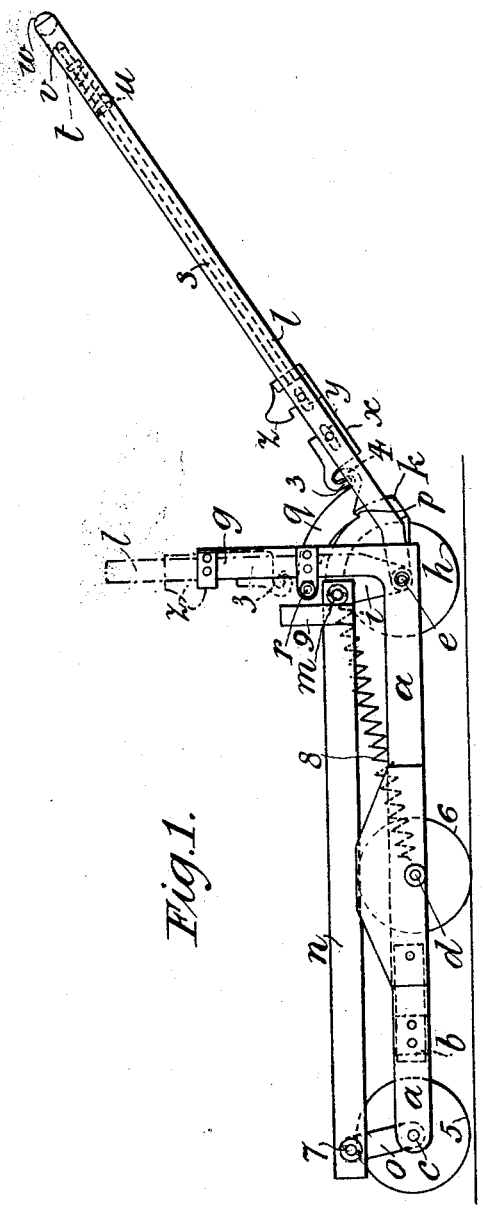
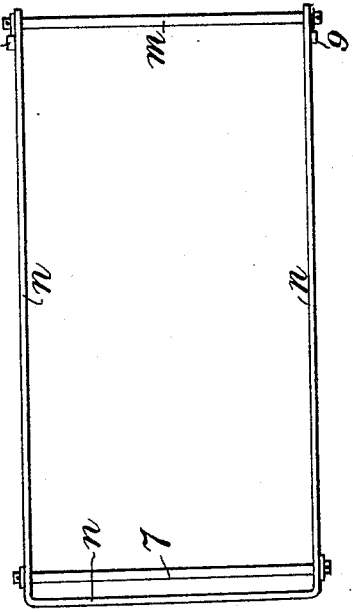
Inventor
Walter E. Kimber,
By ____ Atty.

May 31, 1927.　　　　W. E. KIMBER　　　　1,630,619
LIFTING TRUCK OR TROLLEY
Filed Oct. 11, 1926　　　2 Sheets-Sheet 2
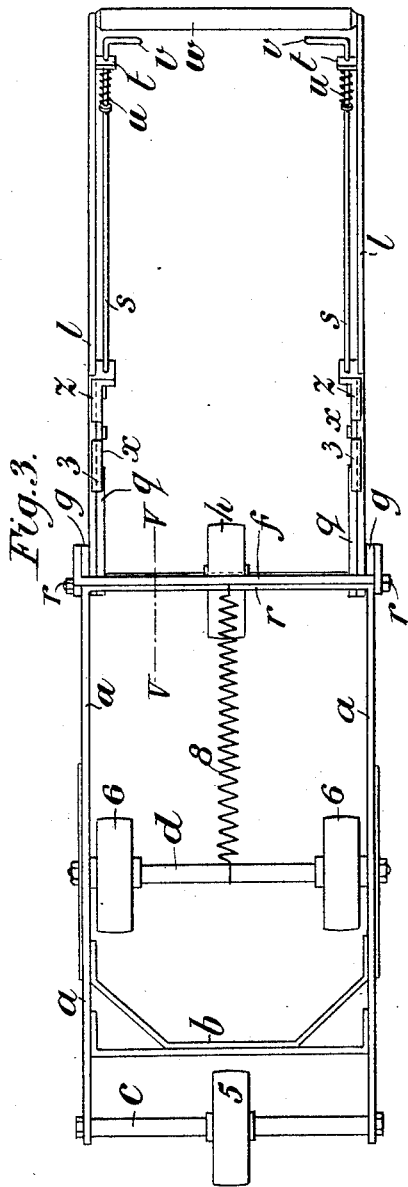
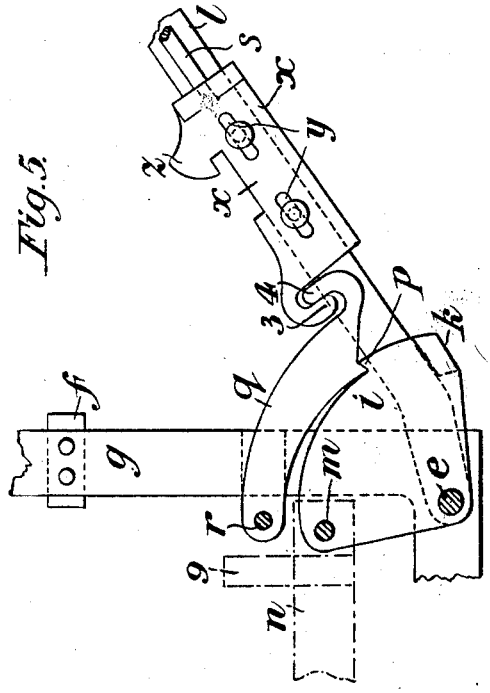
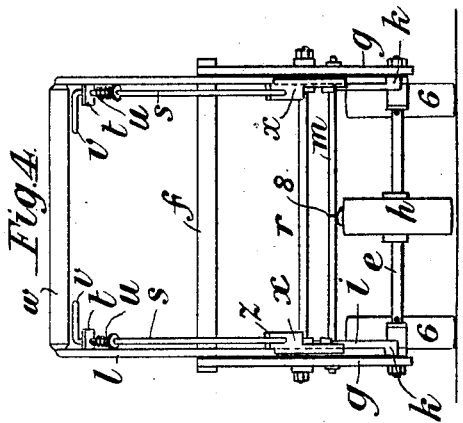
Inventor
Walter E. Kimber Patented May 31, 1927.

1,630,619

UNITED STATES PATENT OFFICE.

WALTER EDWARD KIMBER, OF HIGHGATE, LONDON, ENGLAND, ASSIGNOR TO AJAX TRUCKS LIMITED, OF MANCHESTER, ENGLAND, A CORPORATION OF GREAT BRITAIN.

LIFTING TRUCK OR TROLLEY.

Application filed October 11, 1926, Serial No. 140,851, and in Great Britain July 13, 1925.

This invention comprises improvements in and connected with lifting-trucks or trolleys, these devices comprising a wheeled frame having mounted upon it a liftable frame or platform which receives the load.

The object of the invention is to provide a very simple construction of lifting truck possessing desired characteristics of efficiency and safety, and nevertheless involving no complicated parts liable to derangement or demanding care and attention by more or less skilled persons.

In order that the invention may be readily understood one advantageous construction embodying these improvements will be described with reference to the accompanying drawings, in which:—

Figure 1 is a side elevation of a lifting-truck.

Figure 2 is a plan of the top frame.

Figure 3 is a plan of the truck with the top frame removed.

Figure 4 is an end elevation of the truck, and

Figure 5 is a detail sectional view on the line V—V Figure 3, to a larger scale.

On referring to the drawings, it will be seen that the truck comprises a rectangular bottom frame having side members $a$ connected together near one end by transverse and stiffening members $b$ and at that end by an axle $c$ on which is mounted a floating wheel 5. The side members $a$ are also connected in the middle by an axle $d$ on which are mounted two wheels 6 and at the rear ends by an axle $e$. A transverse rail $f$ is fixed to vertically extending parts $g$ of the side members $a$. A lever handle $l$ of suitable length is pivotally mounted at its lower end on the axle $e$ which may carry a floating wheel $h$. The wheels 5 and $h$ are of smaller diameter than the wheels 6 so that they touch the ground only when the truck is depressed at either end. Also, the wheels 5, and $h$ are free to move along their axles in the guiding of the truck. Other wheel arrangements, or swivel castors may be used in place of floating wheels. On the axle $e$ are pivotally mounted quadrants $i$ formed at one end of their arcs with lugs $k$ extending into the paths of respective limbs of the lever $l$, assuming the latter to be of inverted U-formation as shown. The quadrants $i$ at the opposite ends of the arcs are pivotally connected by a transverse rod or bar $m$ with one end of the liftable frame or platform $n$, the opposite end of the platform being also pivotally connected in known manner to the frame $a$ by a rod 7, and links $o$ (Figure 1) or the like. One or both of the quadrants $i$ is or are formed with a peripheral tooth or projection $p$. On a rod $r$ connected between the vertical members $g$ there are pivotally mounted two detents or drop latches $q$ designed to come into locking engagement with the teeth or projections $p$ of the quadrants $i$ when the latter are pulled over as hereinafter described. The free end of a detent or each detent is of hook-formation and is adapted for being engaged by a pull-hook of a trigger device on the handle, also as hereinafter described. One or both limbs of the handle-lever may be fitted with a trigger device consisting of a rod $s$ slidable in guides $t$ along the inner side of such limb and adapted to be depressed by a spring $u$. The rod or each rod if there be two as shown, is formed at its upper end with a grip handle $v$ which normally lies adjacent to the handle bar $w$ of the lever handle $l$ so that it can be engaged by the fingers without taking the hand off the handle bar. This rod $s$ is connected at its lower end with a latch plate $x$ slidably guided on the said lever $l$ as by stud and slot connection $y$. The latch plate $x$ is formed with a latch device $z$ adapted for snapping over the rail $f$ for the purpose of locking the handle-lever $l$ in the vertical position. Also, the latch plate $x$ is formed with a hook 3 designed for engagement with a hook 4 at the free end of the detent $q$. When the handle lever $l$ has been fully depressed for elevating the liftable frame or platform $n$ and the latter has been locked in the elevated position by the detent $q$ dropping into engagement with the tooth $p$ as seen in Figure 5, the handle-lever $l$ is free to be raised again to the vertical position wherein it is latched by the latch $z$ to the rail $f$. Upon pulling up the latch $z$ by raising the grip handle $v$ and then again lowering the handle-lever $l$, the hook 3 on the latch plate $x$ re-engages the hook 4 on the detent device $q$ ready for the release operation hereinafter described. The tooth or projection of the detent $q$ and the tooth projection or other co-operating device $p$ of the quadrant $i$ have their abutment edges or faces cut back or shaped so that with the tendency of the quadrant $i$ to turn under the gravity effect of the load there is produced an interlock between these parts the tightness and security of which are increased with the load. This action provides a safety feature of the device as hereinafter explained.

In order to prevent the liftable platform *n* from sticking in the raised position it may be connected to the axle *d* or other part of the wheel frame *a* by a spring 8 and to prevent the load from coming into contact with the latch *z* and hook 3, the liftable platform is conveniently furnished with two stops 9 (Figures 1, 2 and 5).

When the truck is without a load, the normal condition will be that in which the liftable frame or platform is in the lowermost position and the handle lever *l* is latched in the vertical position to the rail *f*. In this condition, the truck is wheeled up to a loaded platform or the like, the framings *a* and *n* passing beneath such platform. The handle-lever is now unlatched by applying the fingers to the trigger handle *v* without losing grip of the handle bar *w* and the handle-lever *l* is forcibly depressed, its engagement with the lugs *k* causing the quadrants *i* to turn for elevating the liftable frame or platform *n* with the load thereon. When the fully elevated position is reached, the detent *q* moves into locking engagement with the tooth *p* of the quadrant *i*. In the fully depressed condition of the handle-lever *l*, the hook 3 on the latch plate has engaged the hook 4 of the detent *q* and as the latch plate *x* is depressed by the spring *u* of the trigger device, the action of the said spring assists the detent *q* in clicking into engagement with the tooth *p* of the quadrant. The loaded frame or platform is now securely held in the elevated position and the handle-lever *l* is perfectly free to be returned to the vertical position in which it becomes latched to the rail *f* as aforesaid. The truck is now wheeled away to the desired place for unloading. To unload the truck the trigger device is operated to unlatch the handle-lever *l* which is thereupon depressed to cause its hooks 3 to engage with the hooks 4 of the detents *q* and its limbs to press against the lugs *k* of the quadrants *i*. Owing to the aforesaid tight interlock between the detent *q* and quadrant tooth *p* it is not possible for ordinary finger pressure on the trigger device to retract the latch plate and lift the detent. However, by applying further downward pressure to the handle-lever *l* sufficient for slightly elevating the load, it is then easy to operate the trigger device to effect the release by pulling on the handles *v*, whereupon the loaded frame or platform *n* may descend under control of the handle lever *l*. Thus it is not possible for an unwary or careless person to effect an easy release so as to run the risk of the handle-lever being caused to fly up by the uncontrolled descent of the load and do him injury. The release is effected by exerting sufficient pressure on the handle *l* to enable the disengagement of the detent *q* to be effected from the undercut tooth *p* on the quadrant *i*. Thus at the instant of release, there is full control pressure already applied for controlling the rate of descent of the load.

Naturally, instead of there being a detent at each side and trigger mechanisms on each limb of the lever, as shown, these may be at one side only.

I claim :—

1. A liftable truck or trolley comprising a wheeled frame pivotally supporting a liftable frame adapted for receiving the load, a pivoted lever handle, a pivoted link device adapted for engagement by the lever handle for elevating the liftable frame, toothed detent means pivoted above the said link device on the wheeled frame and adapted to engage the link device and retain the liftable frame in the elevated position, and trigger means on the lever handle adapted for engaging the detent means when the lever is in the lowered position, whereby the toothed detent can be released from the link device by the trigger means to permit of the descent of the liftable frame only after lowering the lever handle.

2. Lifting truck comprising a wheeled frame, a load receiving frame liftably mounted on said wheeled frame and adapted for receiving the load, a parallel linkage connection between said frames, a pivoted lever handle adapted for engaging with a link of said linkage for operating the liftable frame, toothed detent means pivoted on the wheeled frame for engagement of a locking nature with a link of said linkage for automatically retaining said liftable frame in the elevated position, and trigger means on the lever handle for engaging the detent means when the lever handle is in the lowered position.

3. In a lifting truck comprising a liftable frame mounted on a wheeled frame and connected therewith by a system of parallel lifting links, a link of said system constructed in the form of a quadrant provided with a tooth, and an abutment, a detent for engagement with the tooth and automatically operable upon the lifting of said liftable frame to the elevated position, a lever handle to engage said abutment in the lifting or lowering of said frame, coupling means on said detent, and trigger means on said lever handle adapted for automatically engaging said coupling means when said lever handle is lowered, said trigger means being operable for the release of said detent.

4. A lifting truck comprising a liftable frame mounted on a wheeled frame and connected therewith by parallel lifting links, a lever handle pivoted to the wheeled frame and adapted for engaging a link of said linkage to operate the liftable frame, toothed detent means adapted for automatically engaging said link to hold the liftable frame in its raised position, a hook on the detent means, a spring-operated trigger device on the lever handle, a hook on said trigger device adapted for engaging the hook on said detent when the lever handle is lowered, and a latch device slidable on the lever handle, adapted for automatically engaging the wheeled frame to retain the lever handle when raised to an upright position.

5. A lifting truck comprising a liftable frame mounted on a wheeled frame, a parallel linkage connecting the two frames, a pivoted lever handle adapted for engaging a link of said linkage to operate the liftable frame, a pivoted detent adapted for automatically engaging said link to retain the liftable frame after being raised by depressing the lever handle, a plate slidable on the lever handle, a spring operative on said plate to yieldingly press the latter in the direction of the handle pivot, means on said plate adapted for interlocking with the detent when the hand lever is lowered, means for sliding said plate on the hand lever against the action of the spring to release the detent from the link, and a latch device on said plate adapted for automatically engaging the wheeled frame to retain the hand lever when raised.

6. A lifting truck comprising a wheeled frame, a load receiving frame liftably mounted on the latter, a parallel linkage connecting the frames comprising a toothed quadrant having an abutment thereon, a lever pivoted on a wheel axle and movable into engagement with the abutment for rotating the quadrant, a detent pivoted on the wheel frame normally supported by the quadrant and arranged to automatically lock the quadrant when the latter is rotated by the lever to lift the frame, and means on the lever to swing the detent on its pivot out of locking engagement with the quadrant.

WALTER EDWARD KIMBER. [L. S.]